United States Patent [19]

Terada

[11] Patent Number: 5,084,884
[45] Date of Patent: Jan. 28, 1992

[54] METHOD OF STABILIZING THE LASER BEAM AND APPARATUS UTILIZING THE SAME

[75] Inventor: Mitsugu Terada, Kimitsu, Japan

[73] Assignee: Mitsui Petrochemical Industries, Ltd., Tokyo, Japan

[21] Appl. No.: 561,732

[22] Filed: Aug. 1, 1990

[30] Foreign Application Priority Data

Aug. 4, 1989 [JP] Japan .................. 1-202528

[51] Int. Cl.$^5$ .................................................. H01S 3/13
[52] U.S. Cl. .................................... 372/29; 372/98; 372/99; 372/100; 372/102; 372/32; 372/9
[58] Field of Search ............... 372/29, 32, 57, 98, 372/99, 100, 9, 102, 32

[56] References Cited

U.S. PATENT DOCUMENTS

| | | | |
|---|---|---|---|
| 3,437,955 | 4/1969 | Enloe et al. | 372/29 |
| 4,823,354 | 4/1989 | Znotins et al. | 372/57 |
| 4,847,477 | 7/1989 | Smith | 372/29 |
| 4,905,243 | 2/1990 | Lokai et al. | 372/32 |
| 4,914,662 | 4/1990 | Nakatani et al. | 372/29 |

Primary Examiner—Léon Scott, Jr.
Attorney, Agent, or Firm—Sherman & Shalloway

[57] ABSTRACT

According to the invention, a probe laser beam having a wavelength which is different from that of the laser beam emitted from a laser apparatus is introduced into the apparatus to adjust the optical device so that any fluctuations in the probe laser beam passing through or reflected from the optical device may be eliminated. Therefore, any fluctuations in output power and/or the oscillation wavelength of the narrowed bandwidth laser beam emitted from the apparatus can be directly detected and the laser apparatus can be so controlled as to ensure a stabilized operation under an optimum condition.

9 Claims, 2 Drawing Sheets

METHOD OF STABILIZING THE LASER BEAM AND APPARATUS UTILIZING THE SAME

BACKGROUND OF THE INVENTION

This invention relates to a method of stabilizing the laser beam apparatus and an apparatus utilizing the method. More particularly, this invention relates to a method of stabilizing and controlling the wavelength and/or output power of laser beam.

Conventionally, narrow bandwidth laser emitting a specific wavelength beam is utilized in various research areas including high resolution atomic/molecular spectroscopy, isotope separation and semiconductor material technology because of the high wavelength fidelity of such beam.

Recently, efforts have been paid for utilizing a narrow bandwidth excimer laser as a lithography light source in the process of semiconductor production in the semiconductor manufacturing industry.

The properties of a laser beam generated and emitted from a laser apparatus are determined by the wavelength distribution of the gain of the laser medium that the apparatus comprises. A wavelength band showing a large gain normally has a narrow bandwidth, which is dependent to some extent on the properties of the laser medium used in the apparatus. However, for using a conventional laser apparatus as light source for spectroscopy or lithography, the bandwidth of the laser beam emitting from the laser apparatus must be narrower. A technique of disposing wavelength selecting devices such as grating, etalon, birefringent filter or prism within the laser resonator of a laser apparatus has been proposed to realize a narrow bandwidth laser light. This kind of wavelength selecting device works as an optical loss in the laser resonator in such a manner that the gain of the laser medium is limited to those wavelengths which are found within a very narrow bandwidth. It is a well known fact that the optical properties of a wavelength selecting device of this type is liable to be affected by environmental factors such as displacement due to mechanical vibrations and/or fluctuations in the atmospheric pressure and ambient temperature. Therefore, the output power of laser beam and/or wavelength of the laser beam can be varied without any changes in the state of the laser medium or its degradation.

On the other hand, narrow bandwidth laser apparatus to be used for the above applications is required to be highly and constantly stable in terms of output power and oscillation wavelength. It has been proposed for a laser apparatus to have a feedback system for controlling the output power and oscillation wavelength in an attempt to meet this stability requirement. With such a system, a part of generated laser beam is introduced into a spectroscopic system (e.g., an etalon spectroscope) and a beam intensity detector to detect the oscillation wavelength and output power respectively, which is fed back to the bandwidth narrowing devices for fine adjustment of the devices by controlling the variations taking place in the conditions of oscillation so that fluctuations in the oscillation wavelength and output power may be minimized.

Narrow bandwidth laser apparatuses equipped with a control system as described above are currently commercially available and find a number of practical applications. However, the complicacy of the signal processing system, untimely and delayed control operations, generation of overshooting phenomena and other problems of such apparatus make it very difficult to control and operate them in a stabilized manner.

SUMMARY OF THE INVENTION

It is therefore the object of the present invention to secure the stability of output power and/or the oscillation wavelength of a laser apparatus having at least one optical device by controlling and optimizing the condition for the optical device, particularly the wavelength selecting device.

The above object is achieved by providing a method of stabilizing a laser beam emitting from a laser apparatus by introducing a probe laser beam having a wavelength which is different from that of the laser beam emitted from the apparatus into the optical device and so adjusting the optical device that any fluctuations in the probe laser beam passing through or reflected from the optical device may be eliminated.

The method according to the invention can be advantageously used for stabilizing the oscillation wavelength and/or output power of a laser apparatus. With this method, a probe laser beam having a wavelength which is different from that of the laser beam emitted from a laser apparatus is introduced into the optical device of the apparatus. Any variations in the optical device that can cause fluctuations in the oscillation wavelength and/or output power of the laser beam emitted from the apparatus are indirectly detected by detecting directly the fluctuations in the probe laser beam. The optical device is so adjusted that any fluctuations in the probe laser beam passing through or reflected from the optical device may be eliminated and consequently the laser beam emitted from the apparatus may be stabilized in terms of wavelength and/or output power.

A laser apparatus utilizing the method of the invention comprises a laser apparatus main body having at least one optical device, a probe laser device for generating a probe laser beam being introduced into the optical device of the laser apparatus main body and having a wavelength different from that of the laser beam emitted from the laser apparatus main body, a detector for detecting the probe laser beam passing through or reflected from the optical device of the laser apparatus main body and a controller for adjusting the optical device so that any fluctuations in the probe laser beam passing through or reflected from the optical device may be eliminated.

According to the invention, a probe laser beam is applied to the optical device of the laser apparatus main body to detect the condition of the optical device and particularly that of the bandwidth narrowing devices contained in the laser apparatus main body for generating a narrow bandwidth laser beam. The probe laser beam passing through or reflected from said optical device and particularly said bandwidth narrowing devices is detected by said detector.

The optical device contained in the laser apparatus main body of a laser apparatus according to the invention is bandwidth narrowing device such as grating, etalon, birefringent filter and prism, although it may additionally comprises semitransmissive mirror as an output coupler and total reflection mirror as a high reflector in its optical resonator system.

These optical devices may have doubly or multiplily coated with reflection film or anti-reflection film so that they may accommodate both the wavelength of the laser beam emitting from the laser apparatus main body and that of the probe laser beam.

The output power and wavelength of the laser beam emitted from the laser apparatus main body can fluctuate as a result of mechanical vibrations and/or fluctuations in the ambient temperature and atmospheric pressure during the operation of the apparatus. An apparatus according to the invention utilizes the relationship between the fluctuation in the output power and/or wavelength and that of the reflected or transmitted probe laser beam detected by the detector in order to optimize the position and/or angle of the bandwidth narrowing devices and other optical device by means of the controller.

The laser apparatus main body of a laser apparatus according to the invention may be an excimer laser, a dye laser, an alexandrite laser, a Ti-sapphire laser or any other type of laser.

For the probe laser device, a continuously oscillating laser beam generating device such as a He-Ne laser, a He-Cd laser, an Ar ion laser, a Kr ion laser, YAG-SHG cw laser may be advantageously used in combination with a probe optical system for introducing the probe laser beam into the bandwidth narrowing device and/or other optical device of the laser apparatus main body.

The detector preferably comprises an optical system having a beam splitter and lenses and a beam detector such as photodetector or a single photodetector array.

The controller is preferably so designed that it can control the position and/or angle of each of the grating, etalon, prism, birefringent filter, semitransmissive mirror as an output coupler, total reflection mirror as a high reflector and other optical device or each of the combined sets thereof in the laser apparatus main body of said laser apparatus.

With a laser apparatus according to the invention, the probe laser beam reflected by or transmitted through the optical device of the laser apparatus main body after having been introduced to the optical device is examined to detect the condition of the bandwidth narrowing device and/or other optical device. This method of utilizing a probe laser beam is quite different from any of the known methods for detecting fluctuations in the output power and/or wavelength of the laser beam emitted from an existing laser apparatus and controlling the apparatus by means of a feedback mechanism. As the course of degradation of laser oscillation can be detected in a more direct and effective manner, the method of present invention can prevent the degradation of the laser oscillation.

The controller can optimize the position and/or angle of the bandwidth narrowing devices and other optical device of the laser apparatus main body and realize a very narrow bandwidth laser oscillation effectively.

DETAILED DESCRIPTION OF PREFERRED EMBODIMENTS

Now the present invention will be described in greater detail by referring to the accompanying drawings that illustrate preferred embodiments of the invention.

EMBODIMENT 1

Figure 1:
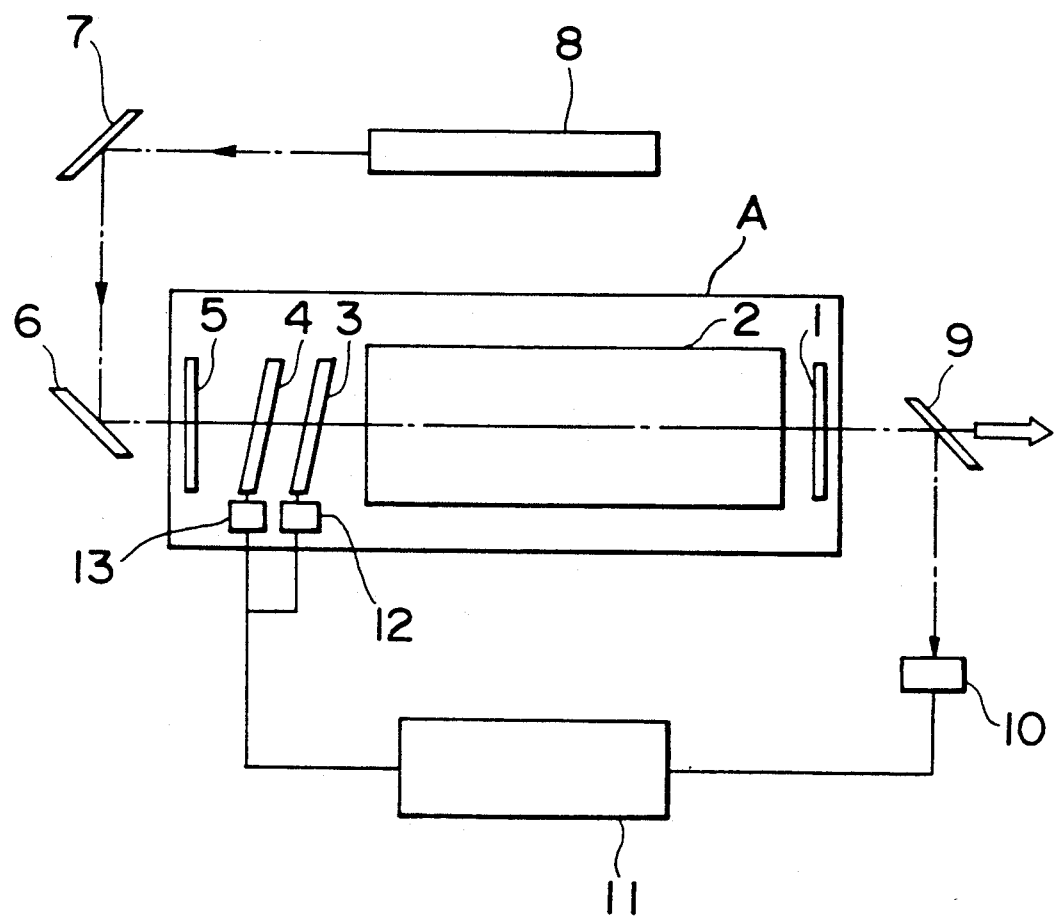
FIG. 1 is a schematic illustration of a preferred embodiment of the invention.

Referring to FIG. 1 a first embodiment of the laser apparatus of the invention, the laser apparatus main body A comprises a laser medium 2 and a pair of bandwidth narrowing elements 3, 4 disposed between an output mirror (output coupler) 1 with a reflection factor smaller than 100% and a total reflection mirror (high reflector) 5 with a reflection factor of 100%, said pair of bandwidth narrowing elements 3, 4 being etalons having a free spectral range and a finesse that afford the etalons 3, 4 a capability of effectively narrowing the bandwidth of the laser beam emitted from the apparatus. The generated laser beam is reciprocally reflected by the output mirror 1 and the total reflection mirror 5 and amplified by the laser medium to become a laser beam in the form of a stationary wave having a given wavelength. While the laser beam oscillated in a conventional laser apparatus does not necessarily show a particular wavelength and can have a number of wavelengths generated simultaneously, the embodiment generates a laser beam with a given single wavelength because of the provision of the bandwidth narrowing devices 3, 4.

On the other hand, a probe laser generating device 8 is provided for introducing a generated probe laser beam having a wavelength, which is different from that of the laser beam generated in the laser apparatus main body A, into the laser apparatus main body A by way of probe optical systems 6, 7 arranged behind the total reflection mirror 5 of the laser apparatus main body A. Thus, the probe laser beam is also applied to the bandwidth narrowing devices 3, 4 in the laser apparatus main body A. In other words, the bandwidth narrowing devices 3, 4 are provided with double or multiple reflection coatings so that they function as etalons at two wavelength regions for the wavelength of the laser beam from the laser apparatus main body A and that of the probe laser beam generated by the device 8.

The laser beam generated in the laser apparatus main body A and the probe laser beam passing through the laser apparatus main body A are then emitted from the output mirror 1.

A beam splitter 9 is arranged in front of said output mirror 1 of the laser apparatus main body A for splitting and catching the probe laser beam. The beam splitter 9 is preferably so coated that it reflects the probe laser beam by 100% and transmits the laser beam generated in the laser apparatus main body A by 100%.

There is provided a beam detector 10 for detecting the probe laser beam picked up by said beam splitter 9. This detector 10 and said beam splitter 9 constitute a optical detector device B of the apparatus.

The beam detector 10 is so designed that it converts the intensity of the probe laser beam into the level of the voltage.

There is also provided a controller 11 for receiving the output signal from the beam detector 10. Actuators 12, 13 which are driven by said controller 11 are respectively disposed in said bandwidth narrowing devices 3, 4.

The embodiment of the invention having a configuration as described above operates in the following manner.

The intensity of the probe laser beam when the laser beam from the laser apparatus main body A is in an optimum condition is defined as a reference intensity and the voltage corresponding to the intensity is defined as a reference voltage and registered in the apparatus (calibration of the controller).

The wavelength and/or output power of the laser beam generated in the laser apparatus main body A can be fluctuated whenever the two etalons 3, 4 lose their tuned condition because of displacements of the etalons 3, 4 and variations in the ambient temperature and atmospheric pressure. The wrong condition of the etalons 3, 4 inevitably fluctuates the quantity of the probe laser beam passing though the etalons.

Consequently, the intensity of the probe laser beam detected by the beam detector 10. The controller 11 drives the actuators 12, 13 to operate to eliminate any such fluctuations by controlling the condition of the etalons 3, 4.

EMBODIMENT 2

Figure 2:
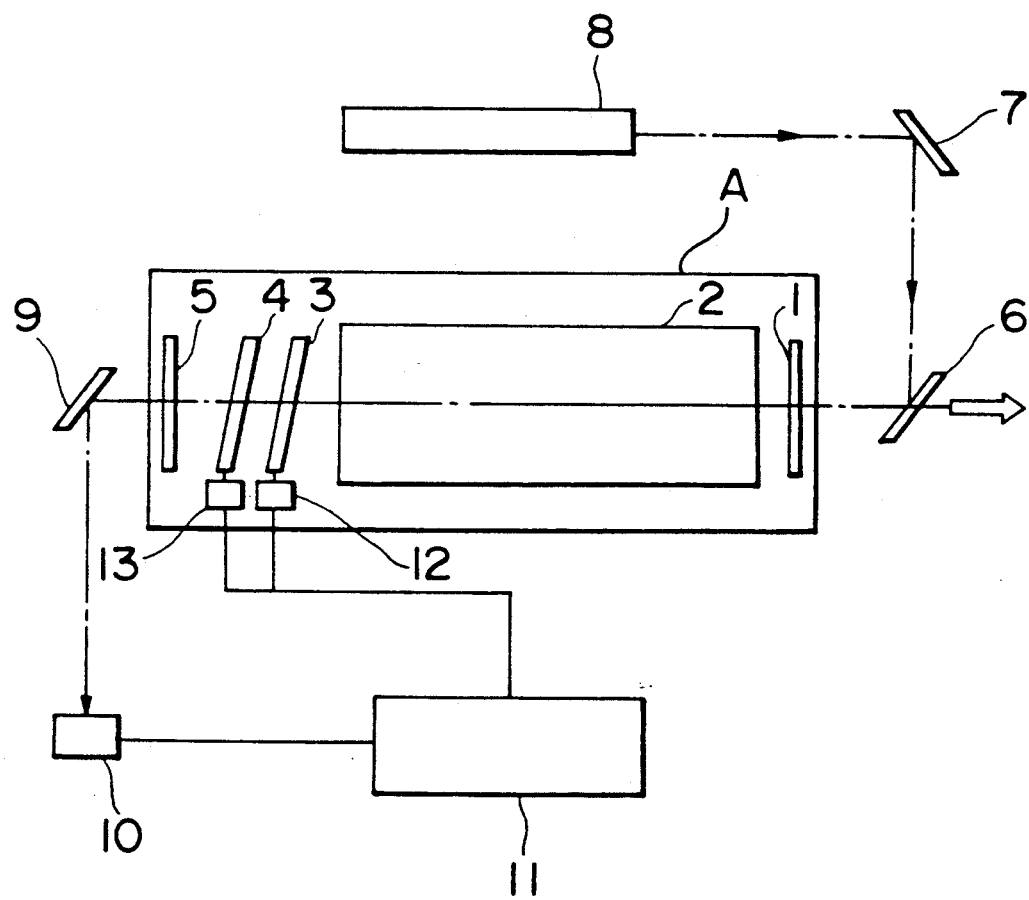
FIG. 2 is a schematic illustration of another preferred embodiment of the invention.

FIG. 2 of the accompanying drawings schematically illustrates a second embodiment of the invention.

In this embodiment, the probe laser beam generated by a probe laser beam generating device 8 is introduced into laser apparatus main body A from the side of output mirror 1 by way of probe optical systems 6, 7 and then detected by a beam detector 10 after passing through a total reflection mirror 5 and a beam splitter 9 so that controller 11 drives actuators 12, 13 to control etalons 3, 4 whenever it is necessary. In this embodiment, the total reflection mirror 5 is so designed that it totally reflects the laser beam from the laser apparatus main body A, while it transmits the probe laser beam. The rest of the configuration and operation of this embodiment is same as that of the first embodiment.

With a laser apparatus according to the invention, since any variations in the state of the bandwidth narrowing devices and other optical device that can cause fluctuations in the output power and wavelength of the narrow bandwidth laser emitted from the apparatus are directly detected by the probe laser beam reflected by or transmitted through the optical device, it can effectively suppress the fluctuations caused by the optical device and ensure an stabilized laser beam emitted by the apparatus under an optimum condition.

What is claimed is:

1. A method of stabilizing a laser beam emitted from a laser apparatus having at least one optical device by introducing a probe laser beam, having a wavelength which is different from that of the laser beam emitted from the laser apparatus, into the optical device of the laser apparatus to detect any variations in the optical device that cause fluctuations in the oscillation wavelength or output power of the laser beam emitted from the apparatus by detecting the fluctuations in the probe laser beam adjusting the optical device to eliminate any fluctuations in the probe laser beam passing through or reflected from the optical device and consequently the laser beam emitted from the apparatus is stabilized in terms of wavelength or output power.

2. A method of stabilizing a laser beam be emitted from a laser apparatus according to claim 1, wherein said laser beam of the laser apparatus has a narrowed bandwidth.

3. A method of stabilizing a laser beam emitted from a laser apparatus according to claim 1, wherein said optical device is selected from the group consisting of grating, etalon, birefringent filter, prism, semitransmissive mirror as an output coupler and total reflection mirror as a high reflector.

4. A laser apparatus comprising a laser apparatus main body having at least one optical device, a probe laser device for generating a probe laser beam to be introduced into the optical device of the laser apparatus main body with a wavelength different from that of the laser beam emitted from the laser apparatus main body, a detector for detecting the probe laser beam passing through or reflected from the optical device of the laser apparatus main body and a controller for adjusting the optical device so that any fluctuations in the probe laser beam passing through or reflected from the optical device may be eliminated.

5. A laser apparatus according to claim 4, wherein said laser beam generated and emitted from a laser apparatus main body has a narrowed bandwidth.

6. A laser apparatus according to claim 4, wherein said probe laser beam device is a continuously oscillating laser, and further comprising a probe optical system for introducing the probe laser beam from said continuously oscillating laser into the optical device and said detector comprises an optical system for catching the probe laser beam passing through or reflected from the optical device of said main body and a laser beam detector for detecting the probe laser beam caught by said optical system.

7. A laser apparatus according to claim 4, wherein said optical device consisting of the group selected from grating, etalon, birefringent filter, prism semitransmissive mirror as an output coupler and total reflection mirror as a high reflector and being multiply coated with reflection film so that they reflect both of the laser beams having a different wavelength from each other and emitted from the laser apparatus main body and that of the probe laser beam.

8. A laser apparatus according to claim 4, wherein said optical device consists of the group selected from grating, etalon, birefringent filter, prism semitransmissive mirror as an output coupler and total reflection mirror as a high reflector, and the controller can control the position and/or angle of the optical device.

9. A laser apparatus according to claim 4, wherein said optical device consists of the group selected from grating, etalon, birefringent filter, prism, semitransmissive mirror as an output coupler, and total reflection mirror as a high reflector, and being multiply coated with anti-reflection film so that they cannot reflect both of the laser beams having a different wavelength from each other and emitted from the laser apparatus main body and that of the probe laser beam.

* * * * *